United States Patent
Sanderson et al.

(10) Patent No.: US 6,645,421 B1
(45) Date of Patent: Nov. 11, 2003

(54) METHOD FOR MAKING A PLASTIC CONTAINER

(75) Inventors: Gary Sanderson, Flintshire (GB); Michael Kloess, Karlsruhe (DE); Pierre Delbarre, Ohlungen (FR)

(73) Assignee: TI Group Automotive Systems Technology Center GmbH, Rastatt (DE)

(*) Notice: Subject to any disclaimer, the term of this patent is extended or adjusted under 35 U.S.C. 154(b) by 606 days.

(21) Appl. No.: 09/644,955

(22) Filed: Aug. 23, 2000

(30) Foreign Application Priority Data

Sep. 17, 1999 (DE) .......................... 199 44 579

(51) Int. Cl.⁷ ............................................. B29C 49/18
(52) U.S. Cl. .................... 264/513; 264/511; 264/512; 264/514; 264/515; 264/516
(58) Field of Search ................. 264/513, 516, 264/511, 512, 514, 515

(56) References Cited

U.S. PATENT DOCUMENTS

| | | |
|---|---|---|
| 2,805,787 A | 9/1957 | Sherman |
| 3,023,461 A | 3/1962 | Sherman |
| 3,082,484 A | 3/1963 | Sherman |
| 3,103,036 A | 9/1963 | Nave et al. |
| 3,113,831 A | 12/1963 | Coale |
| 3,372,429 A | 3/1968 | Kato |
| 3,919,373 A | 11/1975 | Kormendi |
| 4,786,458 A | 11/1988 | Takagi |
| 4,857,258 A | 8/1989 | Le Doux et al. |
| 5,407,629 A * | 4/1995 | Schmidt et al. ............ 264/512 |
| 5,921,416 A * | 7/1999 | Uehara ...................... 215/12.1 |
| 6,066,287 A * | 5/2000 | Brady et al. ................ 264/513 |

FOREIGN PATENT DOCUMENTS

| | | |
|---|---|---|
| DE | 1930948 | 12/1970 |
| FR | 2.119.200 | 7/1972 |
| JP | 39-16942 | 8/1964 |
| JP | 47-1120 | 11/1968 |
| JP | 46-29994 | 12/1968 |

\* cited by examiner

*Primary Examiner*—Suzanne E. McDowell
(74) *Attorney, Agent, or Firm*—Reising, Ethington, Barnes, Kisselle, P.C.

(57) ABSTRACT

A method of forming multi-walled plastic containers in a single blow mold. In general, the method comprises disposing at least two separate parisons simultaneously into a blow mold and forming them to shape one after another by means of a special blow mandrel or pin. A substantially hollow, cylindrical first parison may be disposed around or outside of a substantially balloon or tube shaped second parison in an initially open blow mold. After closing the blow mold, the first or outer parison is expanded outwardly so that its outer surface engages the inner surface of the blow mold to assume the shape thereof, and thereafter, the second or inner parison is blown or outwardly expanded to an extent such that its outer surface at least partially engages the inner surface of the first or outer parison. The outer and inner parisons may be formed of different materials which may desirably impart different properties such as mechanical stability and resistance to permeation of fuel vapor from the container.

18 Claims, 1 Drawing Sheet

METHOD FOR MAKING A PLASTIC CONTAINER

FIELD OF THE INVENTION

The present invention relates to a method of making a plastic container, and more particularly, a multi-wall plastic container.

BACKGROUND OF THE INVENTION

Plastic containers are often made by means of a blow molding method. Such a method generally uses a blow mold having two mold halves each with an internal contour which corresponds to the desired final external contour of the container to be made. A single-walled molten parison is inserted between the mold halves of the open blow mold, the blow mold is closed, and the parison is blown to shape by means of pressurized air provided to the interior of the parison to an extent such that it engages the inner walls of the blow mold so as to assume the shape thereof. The pressurized air is fed by means of a blow mandrel or pin which is inserted into the blow mold from one side or end thereof. When the blow mold is closed, one end of the parison is urged against a neck of the blow mandrel so as to provide, after termination of the blow molding process, a respective opening in the container which may serve, e.g. in fuel tanks, to receive the fuel fill pipe. This method allows single-walled containers to be made in a cost-effective manner.

Particularly in fuel tanks, there is a need to make containers having more than one wall or layer of different materials in order to meet various requirements, for example with respect to mechanical stability or fuel vapor non-permeability. Up to now the making of such containers requires complex multi-step manufacturing methods.

SUMMARY OF THE INVENTION

A method is provided for forming multi-walled plastic containers in a single blow mold. In general, the method comprises disposing at least two separate parisons simultaneously into a blow mold and forming them to shape one after another by means of a special blow mandrel or pin. A substantially hollow, cylindrical first parison may be disposed around or outside of a substantially balloon or tube shaped second parison in an initially open blow mold. After closing the blow mold, the first or outer parison is expanded outwardly so that its outer surface engages the inner surface of the blow mold to assume the shape thereof, and thereafter, the second or inner parison is blown or outwardly expanded to an extent such that its outer surface at least partially engages the inner surface of the first or outer parison. The outer and inner parisons may be formed of different materials which may desirably impart different properties such as mechanical stability or resistance to permeation of fuel vapor from the container.

Preferably, the outer and inner parisons are inserted into the blow mold from opposite ends of the mold. The inner parison is positioned, before being inserted into the blow mold, upon the blow pin which includes a radially internal air feed and discharge passage communicating with the interior of the inner parison and at least one radially outer air feed and discharge passage communicating with the space between the outer and inner parisons. An end of the outer parison adjacent to the blow pin is urged, when the blow mold is being closed, against an area of the blow pin radially outward of the inner parison and generally radially outward of the at least one radially outer air feed and discharge passage.

When a fuel tank is to be made by the method of the invention, the outer parison, which forms the outer enclosure of the finished container, can be made by an extrusion method from a high density polyethylene (HDPE) in order to provide a tough, durable outer enclosure. The inner parison, which forms the internal layer or enclosure of the container, can be made by an injection molding method from a material which is substantially impermeable with respect to hydrocarbons such as ethylene vinyl alcohol (EVOH) or a PET-type thermoplastic resin. Preferably, the inner parison is heated to a temperature below its melting temperature before it is inserted into the blow mold, for example up to a temperature of 150 to 200° C., to facilitate forming the inner parison.

In a preferred embodiment of the invention, when the blow mold has been closed, initially the outer parison is formed to shape while the inner parison is pressurized, by a pressure equal to or less than the pressure used for forming the outer parison to shape, in order to prevent collapse of the inner parison while the outer parison is formed to shape. After the outer parison has been formed to shape, the pressure therein is reduced but preferably some superatmospheric pressure is maintained before the inner parison is formed to shape in order to stabilize the formed outer parison of the container in the mold and to prevent it from collapsing. Thereafter, the inner parison is formed to shape. After cooling for a certain time the pressure in the formed parisons is released, and the finished container can be removed from the blow mold.

In a further preferred modification of the invention, the blow mold has a plurality of preferably rib-like, inwardly extending projections to form corresponding inwardly extending projections of the outer parison when it is formed to shape. The inner parison can be formed to shape to an extent such that its outer surface engages only the rib-like projections on the inner surface of the formed outer parison while a gap between the formed inner and outer parisons remains in the remaining areas.

Objects, features and advantages of this invention include providing a method for forming multi-walled plastic containers which permits the multi-walled container to be formed in a single blow mold, permits various walls of the container to be formed from different materials, permits the walls of the container to be individually formed to shape by a single blow pin, decreases the time and cost required to manufacture a multi-walled plastic container, can provide an air gap between substantial portions of the walls of the container, and is readily adaptable to the formation of plastic fuel tanks having an outer wall designed for strength and durability and an inner wall designed to substantially prevent the permeation to the atmosphere of hazardous hydrocarbon fuel vapors.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 1:
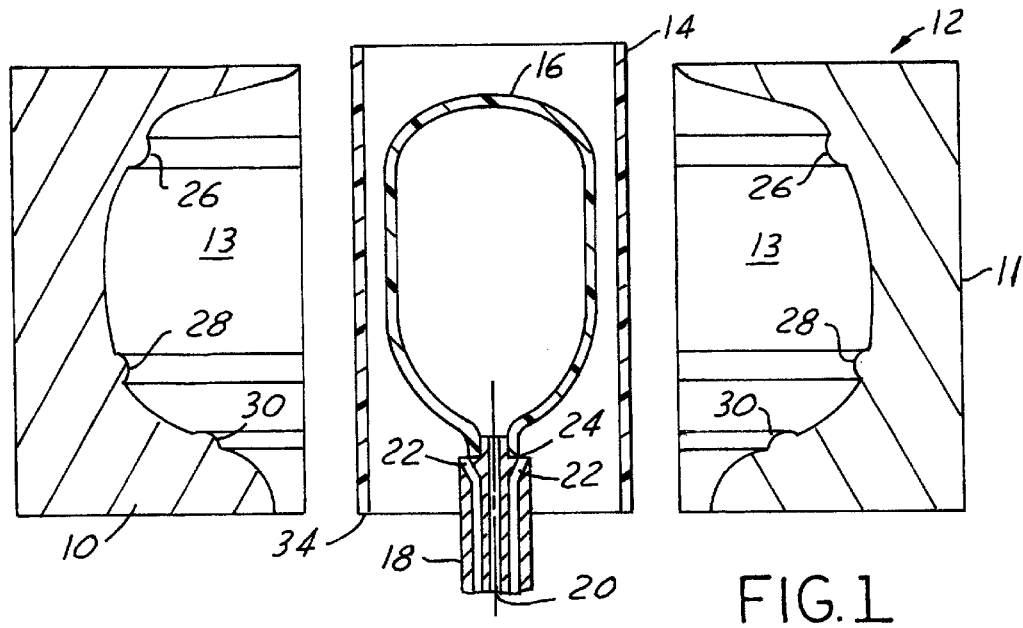
FIG. 1 shows an opened two-part blow mold having a pair of parisons positioned therein, with an inner parison positioned upon a blow pin.

Referring in more detail to the drawings, FIG. 1 shows a blow mold 12 comprising two halves 10, 11 movable between open and closed positions and shown in an open position. An outer parison 14 and an inner parison 16 are disposed between the mold halves 10, 11. The outer parison 14 is in the shape of a hollow cylinder and is preferably made from high-density polyethylene (HDPE), preferably by an extrusion process. The inner parison 16 is preferably in the shape of a balloon or tube and is preferably made from a material impermeable with respect to hydrocarbons such as ethylene vinyl alcohol or a PET-type thermoplastic resin, for example, preferably by an injection molding process. The inner parison 16 may be formed well in advance of the subsequent processing described hereinafter. Before the inner parison 16 is inserted into the blow mold, it is positioned upon a blow pin 18 and is preferably heated to a temperature of about 150° to 200° C., which is below its melting temperature, in an oven externally of the blow mold so that it softens and can be formed as desired.

The blow pin 18 has a central air feed and discharge passage 20 which communicates with the interior of the inner parison 16, and a pair of radially outer air feed and discharge passages 22 which communicate with the cylindrical interior of the outer parison 14 externally of the inner parison, when the blow mold has been closed. To enable the inner parison 16 to be positioned upon the blow pin 18 without blocking the radially outer passages 22, the blow pin 18 has a portion 24 of reduced diameter at its end on which the inner parison 16 is received.

The mold halves 10, 11 have an inner surface 13 which defines a cavity of the blow mold 12 when the mold is closed. The cavity is preferably provided with a plurality of rib-like, inwardly extending projections 26, 28, 30 which provide for respective indentations in the parisons 14, 16 when they are formed to shape. These indentations in the walls of the finished container serve to stiffen the container. Furthermore, the indentations in the outer container wall form abutment surfaces for the inner wall so that a gap between the walls may remain, if necessary, while the inner parison 16 is formed to shape.

Preferably, after the inner parison 16 is provided on the blow pin 18, it is inserted from the bottom of the mold 12 between the mold halves. The outer parison 14 is preferably provided into the mold 12 from the top of the mold 12 from an extruder above the mold. After the parisons 14, 16 have been positioned in the blow mold 12, it is closed in a conventional manner and thereby urges a lower end 34 of the outer parison 14 onto the blow pin 18 with the outer discharge passages 22 communicating with a gap or space between the inner and outer parisons 14, 16 which remain separate from each other. To maintain the parisons 14, 16 separate from each other, a slightly superatmospheric pressure may be introduced between them through the radially outer discharge passages 22 as the mold is closed. In addition or as an alternative, a vacuum or sub-atmospheric pressure may be provided between the mold and the outer parison 14 to maintain the outer parison 14 separate from the inner parison 16. A suitable pressure may be about −10 m bar applied for a duration of 5 seconds.

To begin the blow molding of the parisons, initially, the outer parison 14 is formed to shape by pressurizing its cylindrical interior via pressurized air provided through the radially outer passages 22. In order to prevent the inner parison 16 from collapsing, it is also pressurized via the central air feed and discharge passage 20 by a pressure which is not sufficient to form the inner parison 16 to shape. Thereafter, the pressure used to form the outer parison 14 to shape is reduced to a residual value in order to stabilize the formed outer parison 14' in the blow mold 12 and prevent it from collapsing. The inner parison 16 is then formed to shape by outwardly expanding it with pressurized air provided via the central air feed and discharge passage 20.

Figure 2:
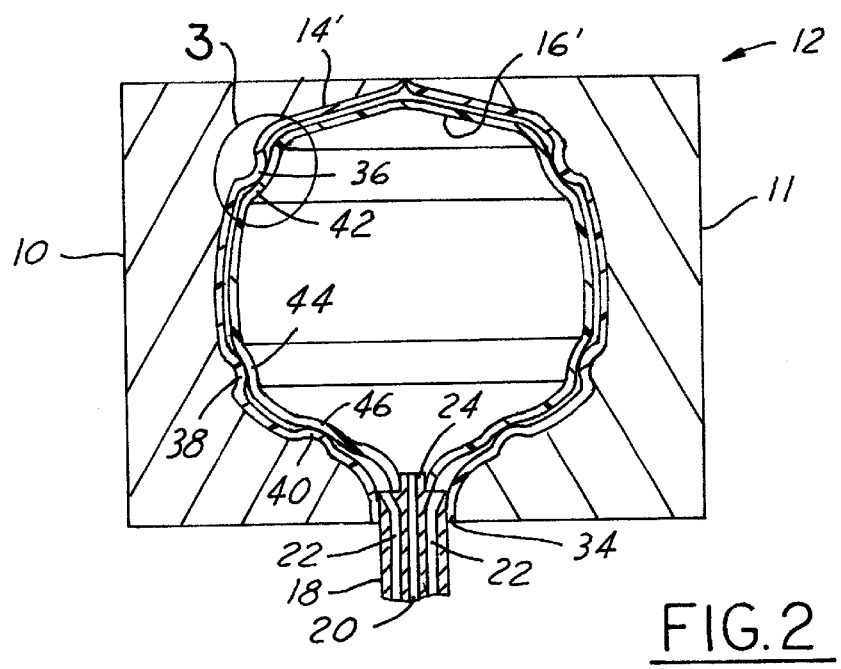
FIG. 2 is a sectional view illustrating the blow mold of FIG. 1 in its closed position after the two parisons have been formed to shape.

In one exemplary embodiment of the method according to the present invention, after the mold is closed, the outer parison is initially formed to shape under a pressure of approximately 1 to 15 bar, and preferably about 6 to 8 bar. A pressure of approximately 1 to 15 bar, and preferably about 4 to 8 bar, is provided into the inner parison to prevent it from collapsing. These pressures are maintained within the inner parison and between the outer parison and inner parison for approximately 30 to 40 seconds to form the outer parison to its final shape. When so formed, as shown in FIG. 2, the outer parison 14' assumes the shape of the internal contour of the cavity 13 and has inwardly extending rib-like projections 36, 38, 40 corresponding to the projections 26, 28, 30 of the mold 12. Thereafter, the pressure in the outer parison 14' is reduced to a pressure of between about atmospheric and 4 bar and the pressure of the inner parison 16 is increased to a pressure of about 1 to 15 and preferably 6 to 8 bar to outwardly expand the inner parison 16 at least partially into engagement with the formed outer parison 14'. The pressure is maintained within the formed inner parison 16' for a sufficient time to ensure that it will maintain its desired final shape. After a certain cooling period the finished container can be removed from the blow mold 12. To facilitate cooling the inner parison, an air flow may be provided therein while maintaining the desired pressure.

Figure 3:
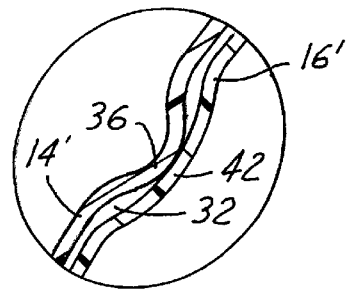
FIG. 3 is an enlarged fragmentary view of the encircled portion 3 in FIG. 2.

As shown in FIGS. 2 and 3, preferably the inner parison 16' is formed to shape only to such an extent that its outer surface engages the projections 36, 38, 40, while a gap 32 (FIG. 3) remains between the walls in the other areas. As shown in FIGS. 2 and 3, this may form corresponding inwardly extending projections 42, 44, 46 in the formed inner parison 16'. The gap between the walls is desirable as it permits the inner wall to move at least slightly relative to the outer wall to facilitate flexing of the inner wall and to improve impact or crash worthiness of the container. Further, maintaining the walls of the container substantially separate from each other improves the leak resistance of the container in that the outer container may be damaged or pierced with the inner wall remaining intact to prevent leakage of any fluid therein. When the blow pin 18 is removed from the container an opening remains which may serve to receive a fuel fill pipe in the case of a fuel tank.

What is claimed is:

1. A method of making a plastic container, comprising the steps of:
    a) providing an outer parison and an inner parison within an initially open blow mold with the inner parison positioned within the outer parison;
    b) closing the blow mold;
    c) providing a pressurized fluid between the inner and outer parisons to form the outer parison to shape independently of the inner parison; and
    d) providing a pressurized fluid into the inner parison to form it to shape to an extent such that it at least partially engages the outer parison.

2. The method of claim 1 wherein said inner and outer parisons are inserted into the blow mold from opposite sides of the mold.

3. The method of claim 1 wherein said inner parison is positioned, before being inserted into the blow mold, upon a blow pin which includes a central air feed and discharge passage communicating with the interior of the inner parison and at least one radially outer air feed and discharge passage for forming the outer parison to shape.

4. The method of claim 1 wherein said inner parison is heated before it is inserted into the blow mold.

5. The method of claim 4 wherein said inner parison is heated to a temperature of between 150° to 200° C.

6. The method of claim 1 wherein said outer and inner parisons are made of different plastic materials.

7. The method of claim 6 wherein said outer parison is made from high density polyethylene and said inner parison is made from a material substantially impermeable to hydrocarbons.

8. The method of claim 1 wherein said outer parison is made by an extrusion method.

9. The method of claim 1 wherein said inner parison is made by an injection molding method.

10. The method of claim 1 wherein an end of said outer parison which is adjacent to the blow pin is urged against the blow pin when the blow mold is closed.

11. The method of claim 1 wherein when the blow mold has been closed, initially said outer parison is formed to shape while said inner parison is pressurized by a pressure less than the pressure used for forming said outer parison to shape.

12. The method of claim 11 wherein said pressure less than the pressure used to form the outer parison is between 4 to 8 bar.

13. The method of claim 1 wherein the pressure used for forming said outer parison to shape is reduced to a smaller pressure upon termination of said forming to shape of the outer parison.

14. The method of claim 1 wherein a blow mold having a plurality of rib-like projections is used.

15. The method of claim 14 wherein said outer parison is formed to shape in the blow mold and obtains rib-like projections corresponding to said rib-like projections of the blow mold and said inner parison is formed to shape to an extent such that its outer surface engages the rib-like projections of said outer parison while a gap remains between the formed parisons in the remaining areas.

16. The method of claim 1 wherein as the mold is closed, pressurized fluid is provided into a space between the inner and outer parisons to maintain them at least substantially separate from each other.

17. The method of claim 1 wherein the pressurized fluid provided in step (c) is at between 1 to 15 bar.

18. The method of claim 1 wherein the pressurized fluid provided in step (d) is at between 1 to 15 bar.

* * * * *